(12) United States Patent
Sui (10) Patent No.: US 8,021,162 B2
(45) Date of Patent: Sep. 20, 2011

(54) NAVIGATION SURGICAL TRAINING MODEL, APPARATUS HAVING THE SAME AND METHOD THEREOF

(75) Inventor: Leung Kwok Sui, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 1078 days.

(21) Appl. No.: 10/913,916

(22) Filed: Aug. 6, 2004

(65) Prior Publication Data

US 2006/0029917 A1 Feb. 9, 2006

(51) Int. Cl.
*G09B 23/28* (2006.01)
(52) U.S. Cl. ........ 434/274; 434/262; 434/267; 600/424; 606/96; 606/130; 73/1.81
(58) Field of Classification Search .................. 434/262, 434/263, 267, 274, 1; 606/96, 130; 73/1.81; 600/424
See application file for complete search history.

(56) References Cited

U.S. PATENT DOCUMENTS

| | | | | |
|---|---|---|---|---|
| 4,106,219 A | * | 8/1978 | Schneider et al. | 434/274 |
| 4,331,428 A | * | 5/1982 | Chandler | 434/274 |
| 4,433,961 A | * | 2/1984 | Chandler | 434/274 |
| 4,734,039 A | * | 3/1988 | Thompson | 434/274 |
| 4,832,978 A | * | 5/1989 | Lesser | 427/203 |
| 5,607,311 A | * | 3/1997 | Browne-Wilkinson | 434/274 |
| 5,921,992 A | * | 7/1999 | Costales et al. | 606/130 |
| 5,947,743 A | * | 9/1999 | Hasson | 434/262 |
| 5,997,307 A | * | 12/1999 | LeJeune, Jr. | 434/262 |
| 6,083,163 A | * | 7/2000 | Wegner et al. | 600/429 |
| 6,285,902 B1 | * | 9/2001 | Kienzle et al. | 600/427 |
| 6,379,302 B1 | * | 4/2002 | Kessman et al. | 600/437 |
| 6,450,978 B1 | * | 9/2002 | Brosseau et al. | 600/595 |
| 6,470,207 B1 | * | 10/2002 | Simon et al. | 600/426 |
| 6,490,475 B1 | * | 12/2002 | Seeley et al. | 600/426 |
| 6,662,036 B2 | * | 12/2003 | Cosman | 600/411 |
| 6,701,174 B1 | * | 3/2004 | Krause et al. | 600/407 |
| 6,711,432 B1 | * | 3/2004 | Krause et al. | 600/427 |
| 6,908,309 B2 | * | 6/2005 | Gil et al. | 434/267 |

(Continued)

OTHER PUBLICATIONS

DiGioia et al., "Computer Assisted Orthopaedic Surgery: Image Guided and Robotic Assistive Technologies", (1998) Clin. Orthop., 1(354), 8-16.

(Continued)

*Primary Examiner* — Xuan M Thai
*Assistant Examiner* — Kang Hu
(74) *Attorney, Agent, or Firm* — Knobbe Martens Olson & Bear LLP (57) ABSTRACT

Disclosed is a navigation-training model comprises a base, a holding device for securing a surgical practice model bone to the base in a predetermined position, and a support for fixing a patient tracker onto the base at a predetermined orientation. With the fixed relative positions of the support and the holding device, constant orientation of the patient tracker and the surgical practice model bone is achieved each time they are placed on the navigation-training model. A navigation-training apparatus having the navigation-training model is also disclosed, which includes a navigation system and a surgical tool with a tool tracker. Fluoroscopic images of the surgical practice model bone are captured once and uploaded into a computer of the navigation system. The practice of the fluoroscopic images-guided orthopedic surgery can thus be carried out with the fluoroscopic images loaded onto the navigation system without the need for further fluoroscopy. This eliminates X-ray exposure and standardizes the procedures of navigation-training.

11 Claims, 12 Drawing Sheets

U.S. PATENT DOCUMENTS

| | | | |
|---|---|---|---|
| 6,932,610 B2 * | 8/2005 | Ono et al. | 434/274 |
| 6,990,220 B2 * | 1/2006 | Ellis et al. | 382/128 |
| 7,167,738 B2 * | 1/2007 | Schweikard et al. | 600/407 |
| 7,427,200 B2 * | 9/2008 | Noble et al. | 434/274 |
| 2002/0077543 A1 * | 6/2002 | Grzeszczuk et al. | 600/424 |
| 2004/0030245 A1 * | 2/2004 | Noble et al. | 600/426 |
| 2004/0102792 A1 * | 5/2004 | Sarin et al. | 606/151 |
| 2005/0142525 A1 * | 6/2005 | Cotin et al. | 434/262 |
| 2005/0245820 A1 * | 11/2005 | Sarin | 600/429 |

OTHER PUBLICATIONS

Kahler, "Image Guidance: Fluoroscopic Navigation", (2004) Clin. Orthop., 1(421), 70-76.

* cited by examiner

NAVIGATION SURGICAL TRAINING MODEL, APPARATUS HAVING THE SAME AND METHOD THEREOF

BACKGROUND OF THE INVENTION

1. Field of the Invention

The present invention relates to a navigation-training device for the surgery, particularly to a navigation-training model for the fluoroscopic images-guided orthopedic surgery and apparatus having the model as well as a method for using the same.

2. Description of the Related Art

Computer-assisted surgery has significantly redefined the way that surgical operations are performed. By combining computer software with trackers, the surgical navigation apparatus holds great promise for minimally invasive surgery. During image-guided orthopedic surgery, trackers are used to track the position of the patient's surgical anatomy (called patient tracker) and the surgeon's tools (called tool tracker) in real time with reference to the pre-acquired images. A typical fluoroscopically-based surgical navigation system employs a patient tracker for insertion into the patient's body. It tracks the surgical site of interest of a patient. X-ray images are then taken utilizing a fluoroscopic imager which is also tracked by the navigation system. The surgeon then positions and guides the tracked surgical tool to the preoperatively planned locations with the aid of the quantitative and qualitative navigational information after calibration of the tracked surgical tool in the same 3D coordinate system as the fluoroscopic images and the patient tracker. This relatively new technology will be increasingly used in the coming years due to its advantages. Like in all new surgical procedures, pre-surgery training is vital for the success in surgery to guarantee quality treatment, to avoid complications and to ensure good clinical results. This is of special importance where new computer technologies are combined with surgical procedures.

DiGioia A M III et al., (1998) Computer Assisted Orthopedic Surgery: Image Guided and Robotic Assistive Technologies. *Clin. Orthop.*, 1(354), 8-16, and Kahler D. (2004) Image Guidance: Fluoroscopic navigation, *Clin. Orthop.*, 1(421), 70-76, disclose information on image-guided surgical navigation, which are incorporated herein as references.

However, without standardized procedures and designated training models, surgeons may experience significant difficulty during training on using the surgical navigation apparatus. During in vitro surgical navigation training, the surgical practice model bone is difficult to be orientated in the same position before and after fluoroscopically imaging and in the same position relative to the patient tracker. It often requires a great deal of adjustments before the correct location can be identified. Repeated fluoroscopy therefore has to be done before each training practice. It is cumbersome while providing less than satisfactory system for training. For practice in human and animals, while the problem with the change in relative positions between the patient tracker and the tool tracker cannot be totally solved and hence fluoroscopic images still have to be taken to determine the position during the training, these practical sessions are expensive and time-consuming as well as presenting an ethical issue.

At present, there is no satisfactory means for obtaining extensive, inexpensive, non-operative experience in using the surgical navigation system.

SUMMARY OF THE INVENTION

An object of the present invention is to provide a navigation-training model for fluoroscopic images-guided orthopedic surgery, by which constant orientation and relative positions of the patient tracker and the surgical practice model bone can be achieved each time they are placed on the navigation-training model. No repeated fluoroscopy has to be taken and this reduces the X-ray exposure of the trainer. The navigation-training model is portable and can be used for training on any navigation-training system. It provides effective, inexpensive and extensive training on surgical navigation procedures.

The navigation-training model for orthopedic surgery according to the invention comprises a base, a holding device for fixing a surgical practice model bone to the base in a predetermined position, and a support mounted to the base for securing a patient tracker in a predetermined orientation.

The surgical practice model bone used in the invention is a model bone such as, but not limited to, a plastic pelvic bone, a plastic proximal femur bone, and a plastic femur bone covered with or without insulating material and inserted with a stainless steel rod.

In an embodiment of the navigation-training model, the surgical practice model bone is a plastic pelvic bone, the support is a pin tilted in a first predetermined angle with the surface of the base, the holding device includes two parted stainless steel poles and two parted stainless steel screws in two parallel rows and the base which maintains constant orientation and relative positions of the patient tracker and the plastic pelvic bone for the training.

In another embodiment of the navigation-training model, the surgical practice model bone is a plastic proximal femur bone, the base is in a rectangular shape, the support is a patient tracker pin fixed to the base so as to form a second predetermined angle with the base and a third predetermined angle between the projecting line of the patient tracker pin onto the base and the elongated side of the base.

The holding device in this embodiment includes two parted metal poles and a holding block mounted therebetween along the elongated side of the base. The holding block has a lower portion disposed on the base and an upper portion removable from the lower portion, two windows are provided symmetrically at the joint between the upper portion and the lower portion, and a tunnel is provided extended along the elongated direction of the base between the two windows to hold the plastic proximal femur bone.

The base in this embodiment maintains constant orientation and relative positions of the patient tracker and the plastic proximal femur bone for the training.

In still another embodiment of the navigation-training model, the surgical practice model bone is a plastic femur bone, covered with insulating materials and inserted with a stainless steel rod with two parallel holes at the distal end thereof.

The holding device in this embodiment includes a first and a second holding blocks mounted on the base, the first holding block secures a support which is a patient tracker pin tilted in a predetermined direction and secures the stainless steel rod horizontally extended towards the second holding block, and the second holding block has two windows and a tunnel is provided extended along the elongated direction of the base between the two windows to hold the plastic femur bone.

The base in this embodiment maintains constant orientation and relative positions of the patient tracker and the plastic femur covered with insulating materials for the training.

Another object of the present invention is to provide a navigation-training apparatus for fluoroscopic images-guided orthopedic surgery, which is designed to permit a surgeon to practice a fluoroscopic images-guided orthopedic surgery in a simulated environment.

According to the invention, the navigation-training apparatus for fluoroscopic images-guided orthopedic surgery comprises:

a navigation-training model including: a base, a holding device for fixing a surgical practice model bone to the base in a predetermined position, and a support mounted on the base for securing a patient tracker in a predetermined orientation;

a navigation system having a computer that stores a plurality of fluoroscopic images of the surgical practice model bone; and at least one surgical tool attached with a tool tracker communicated with the navigation system.

In the apparatus of the present invention, the navigation system can track the location of the surgical tool on a display thereof with respect to the fluoroscopic images and the patient tracker in a 3D coordinate system, when a navigation training is performed.

Still another object of the present invention is to provide a navigation-training method for fluoroscopic images-guided orthopedic surgery, by which constant orientation and relative positions of the patient tracker and the surgical practice model bone are maintained. A surgeon can practice surgical procedures using a surgical tool attached with a tool tracker without repeated fluoroscopy and the result can be observed on a display of the navigation system in real-time.

According to the invention, the navigation-training method for fluoroscopic images-guided orthopedic surgery comprises:

1) providing a navigation-training model, which includes: a base; a holding device for fixing a surgical practice model bone to the base in a predetermined position; and a support mounted to the base for securing a patient tracker in a predetermined orientation;
2) providing fluoroscopic images of the model bone and uploading the same in the navigation system;
3) loading the fluoroscopic images on a display of the navigation system; and
4) performing a navigation training with a surgical tool attached with a tool tracker communicating with the navigation system tracking the location of the surgical tool on the display with respect to the fluoroscopic images and the patient tracker in a 3D coordinate system.

By utilizing the navigation-training apparatus and the training method for fluoroscopic images-guided orthopedic surgery of the present invention, the fluoroscopic images of the model bone are captured once. There is no need to take further fluoroscopic images and no need to adjust the relative positions of the patient tracker and the surgical practice plastic bone during training. X-ray exposure to the training personnel is therefore eliminated. The fluoroscopic image sets and the navigation-training models are portable and can be used for training on any navigation system.

During the training for a specific fluoroscopic images-guided orthopedic surgery, the surgeon just puts the patient tracker and a surgical practice model bone in the fixed position of the navigation-training model, so that constant orientation and relative positions of the patient tracker and the surgical practice model bone are achieved. Then specific fluoroscopic images are recalled from the computer of the navigation system. The surgeon can thus practice the procedures with a surgical tool with a tool tracker attached, and the result can be observed on the display of the navigation system in real-time.

Therefore, the present invention provides a simple, low cost, efficient and safe training model, apparatus and method that allow a surgeon to practice fluoroscopic images-guided orthopedic surgery without the need for assistance, complicated surgical set-ups, adjustments of relative positions of the patient tracker and the model bone, and the exposure to X-ray.

Other objects and advantages of the present invention will become apparent from the following detailed description when read in conjunction with the accompanying drawings.

DETAILED DESCRIPTION OF THE PREFERRED EMBODIMENT

The present invention will be further described below with reference to the drawings.

In the present invention, the term "a patient tracker" is a common tracker used in this field, provided that it can be used to track the relative position of the surgical site relative to the fluoroscopic images. The term of "a tool tracker" may be the same type of tracker as the patient tracker or any of those used in the art, provided that it can be used to track the position of the tool relative to the fluoroscopic images and the patient tracker. Trackers that can be used in the present invention may be from different companies using different tracking technologies like optical, ultrasound and electromagnetic. Example of the tracking system used in the invention include, but not to be limited, optical tracking system using Infrared cameras and LED trackers (optical type) commercially obtained from Stryker Corp (Corporate headquarters, Michigan USA).

The fluoroscopic images of the model are live X-ray images captured by a mobile C-arm fluoroscope. During actual surgical procedure, a patient tracker is inserted into the patient's body and it tracks the surgical site of interest of a patient. X-ray images are then taken by a C-arm fluoroscope which is also tracked by the navigation system. Therefore, their relative positions are known. The fluoroscopic images are displayed on the computer of the navigation system. A surgical tool is attached with a tool tracker and both are calibrated and validated in the calibration station which communicates with the IR camera of the navigation system. This serves to calibrate the surgical tool and the tool tracker in the same 3D coordinate system as the patient tracker and the fluoroscopic images. The tracked tool is shown as crosshairs on the fluoroscopic images displayed on the computer screen. The surgeon can then use the tracked surgical tool for surgical planning and surgical operation.

In a first embodiment of the present invention, a pelvic navigation-training apparatus is provided for training on computer-assisted fluoroscopic images-guided surgery to fix pelvic fractures with screw insertion. The pelvic navigation-training apparatus comprises a pelvic navigation-training model and a navigation system having a computer that stores a plurality of fluoroscopic images of the plastic pelvic model bone mounted on the navigation-training model.

Figure 1:
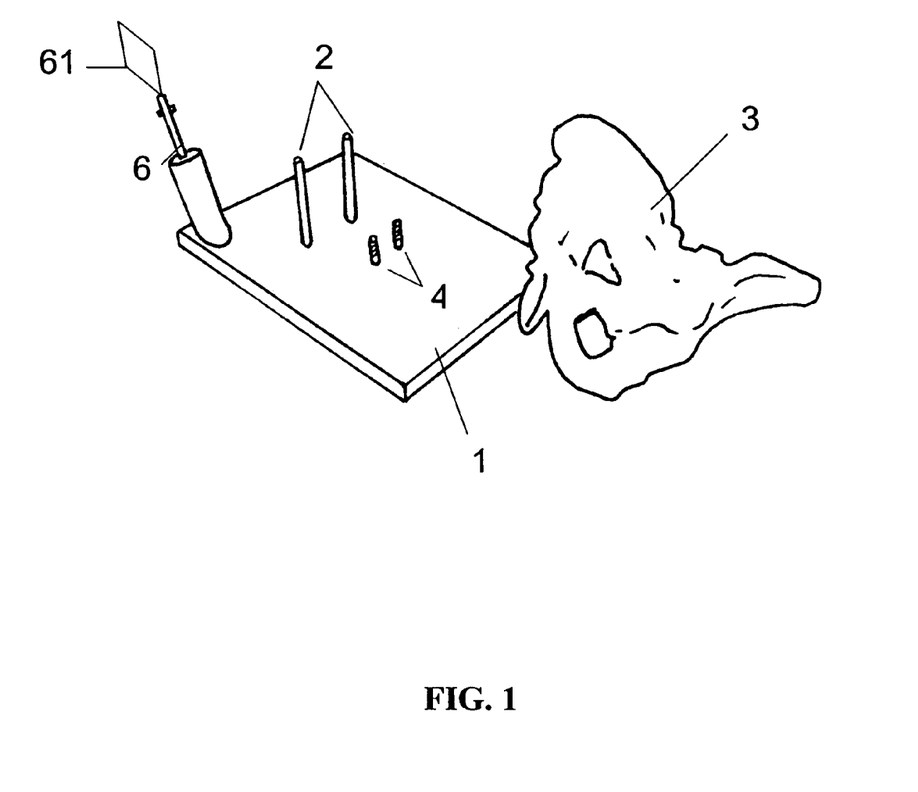
FIG. 1 shows a pelvic fracture fixation navigation-training model and a plastic pelvis model bone placed next to the navigation-training model.
Figure 2:
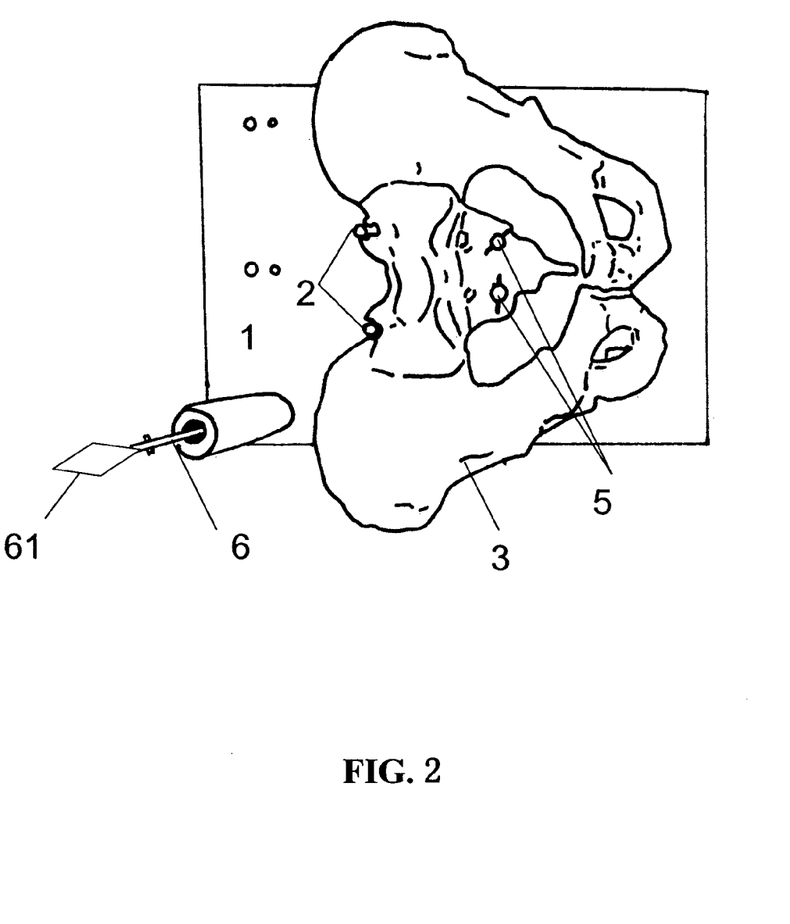
FIG. 2 shows a plastic pelvis model bone fixed onto the pelvic fracture fixation navigation-training model in FIG. 1.
Figure 3:
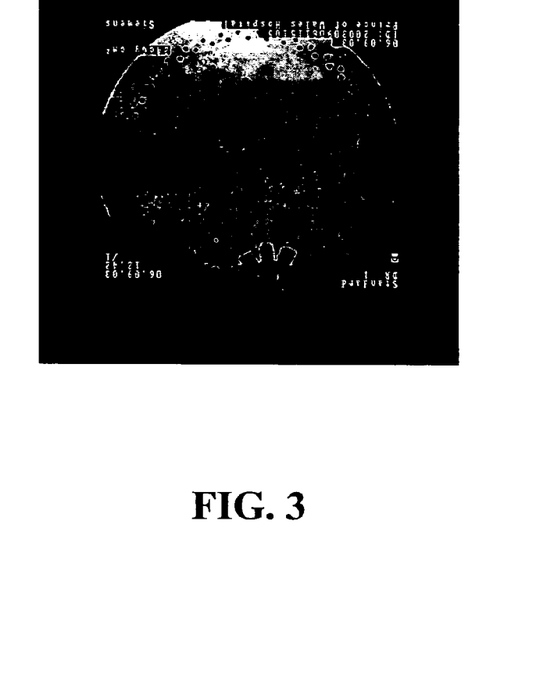
FIG. 3 shows a fluoroscopic image of the outlet view of the plastic pelvis model bone secured on the pelvic fracture fixation navigation-training model as shown in FIG. 1.
Figure 4:
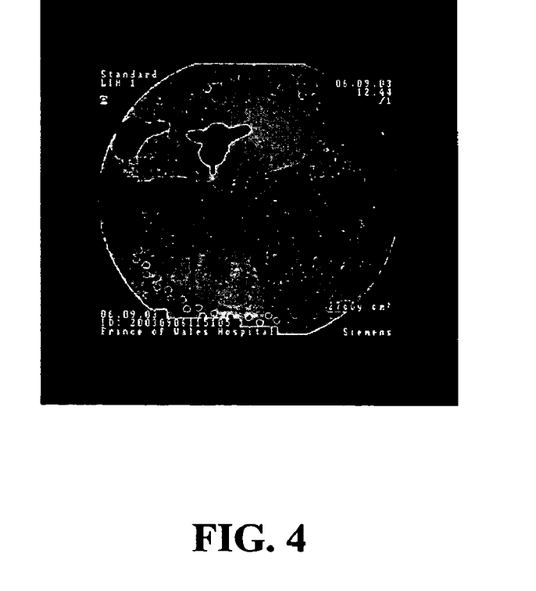
FIG. 4 shows a fluoroscopic image of the inlet view of the plastic pelvis model bone secured on the pelvic fracture fixation navigation-training model as shown in FIG. 1.
Figure 5:
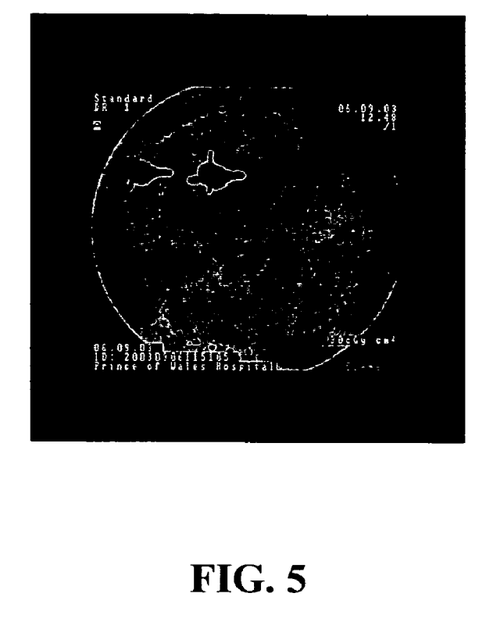
FIG. 5 shows a fluoroscopic image of the frontal view of the plastic pelvis model bone secured on the pelvic fracture fixation navigation-training model as shown in FIG. 1.
Figure 6:
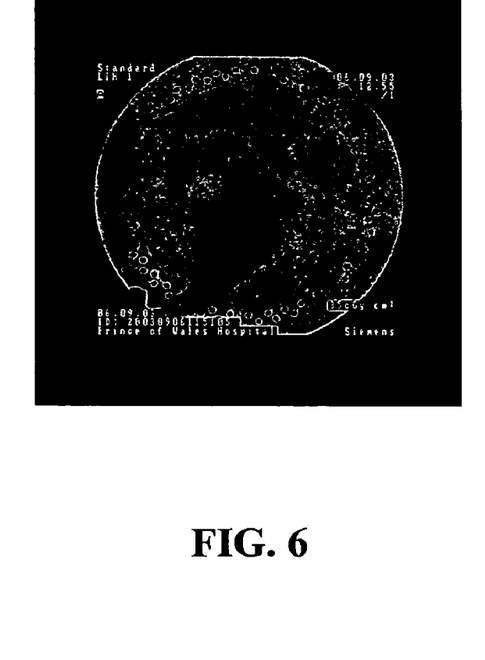
FIG. 6 shows a fluoroscopic image of the true sagittal view of the plastic pelvis model bone secured on the pelvic fracture fixation navigation-training model as shown in FIG. 1.

Referring to FIGS. 1 and 2, the pelvic navigation-training model used in this pelvic navigation-training apparatus includes: a base 1, a holding device for fixing a plastic pelvic model bone 3 on the base 1 in a precise position for training of the specific orthopedic surgical procedure, and a patient tracker pin 6 mounted on the base 1 and set in a predetermined orientation for securing a patient tracker 61.

In this embodiment of the invention, the base 1 used in this pelvic navigation-training model is made of acrylic, and formed in a rectangular shape with a size of 355 mm (L)×255 mm (W)×15 mm (H).

The holding device includes two parted stainless steel poles 2 and two parted stainless steel screws 4, which are in two rows and parallel. For example, the two stainless steel poles 2 which are of a size of 6 mm in diameter and 100 mm in height are fixed on the base 1 to maintain the precise position of the plastic pelvic model bone 3, and are 65 mm apart from each other. Two stainless steel screws 4 of 5 mm in diameter are attached to the base 1 for passing through the sacral foramina of the sacrum of the plastic pelvic model bone 3 and are 35 mm apart from each other. The plastic pelvic model bone 3 is then further secured on the base with nuts 5. The stainless steel poles 2 and screws 4 are fitted accurately to two brands of plastic model bones.

The patient tracker pin 6 is fixed on the base and tilted 70° from the surface of the base 1 for fitting the patient tracker 61 in this embodiment, which visualizes the plastic pelvic model bone 3 for the training of screw fixation of pelvic fractures.

With the plastic pelvic model bone 3 being fixed to the pelvic navigation-training model, fluoroscopic images of the plastic pelvic model bone 3 are taken by a C-arm fluoroscope (not shown) and stored in a computer of a navigation system. FIGS. 3 through 6 respectively show outlet, inlet, frontal, and true sagittal views of these fluoroscopic images of the plastic pelvic model bone 3. The fluoroscopic images stored in the computer can be retrieved for surgically training.

A surgical tool attached with a tool tracker is communicated with a navigation system. The navigation system provides the calibration and display of the relative positions of the patient tracker, the fluoroscopic images and the tracked surgical tool in a common 3D coordinate system.

Figure 7:
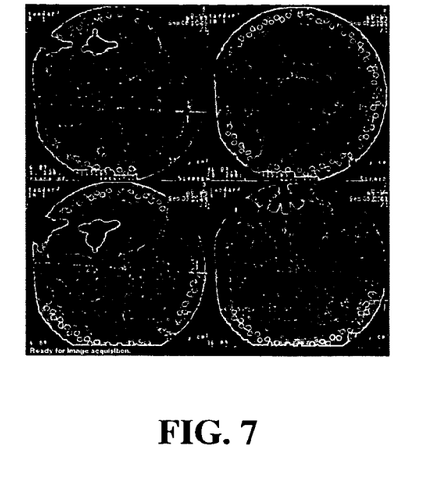
FIG. 7 shows loading of fluoroscopic images of the frontal, true sagittal, inlet and outlet views of the plastic pelvis secured on the pelvic fracture fixation navigation-training model from the system during training.

During the training, the plastic pelvis model bone 3 and the patient tracker 61 are placed on the navigation-training model. The fluoroscopic images of different views of the plastic pelvis model bone 3 as shown in FIG. 7 are loaded onto the computer of the navigation system. A tool tracker is fixed on the surgical tool and both are calibrated with the navigation system. Crosshairs show the relative locations of the surgical tool to the fluoroscopic images and the patient tracker in different views on a display of the navigation system. The trainee can thus practice computer-assisted images-guided screw insertion using the navigation-training model with the surgical tool. The procedures can be followed exactly and the result can be observed on the display in real-time.

In a second embodiment of the present invention, a hip screw/intramedullary fixation of trochanteric fractures navigation-training apparatus is provided for training on fluoroscopic images-guided cannulated hip screws and Gamma nail insertion and lag screw positioning. This fluoroscopic images-guided navigation-training apparatus comprises a corresponding navigation-training model, and a navigation system having a computer that stores a plurality of fluoroscopic images of the plastic proximal femur model bone mounted on the navigation-training model.

Figure 8:
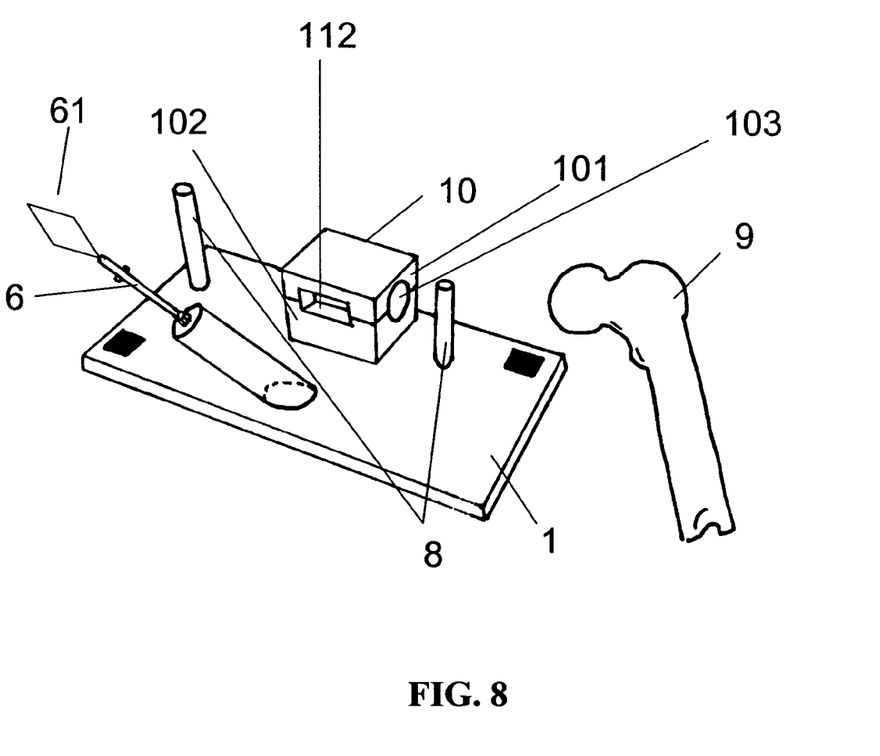
FIG. 8 shows a navigation-training model for hip screw/intramedullary fixation of trochanteric fractures and a plastic proximal femur model bone placed next to the navigation-training model.
Figure 9:
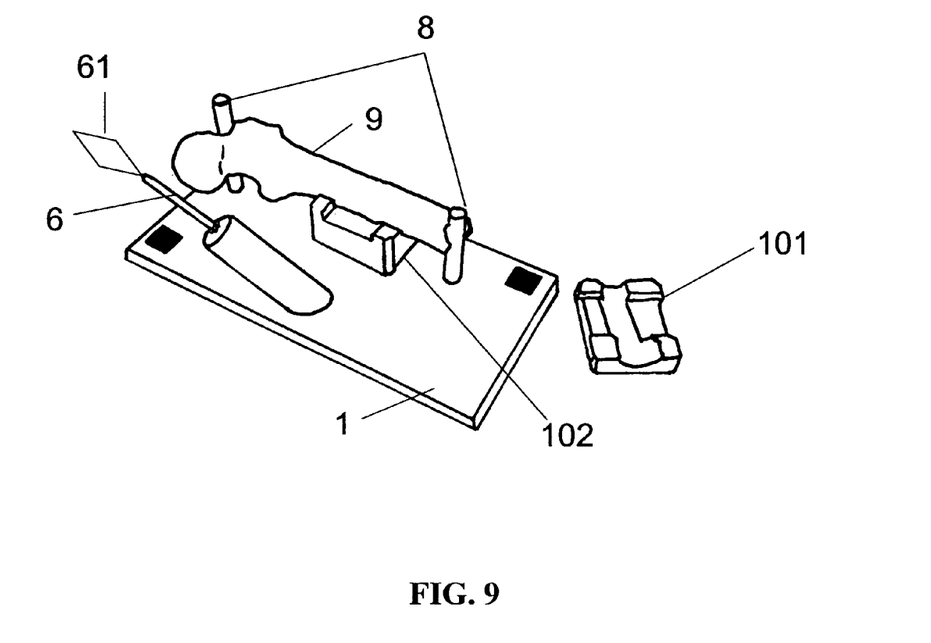
FIG. 9 shows the plastic proximal femur model bone placed onto the navigation-training model for hip screw/intramedullary fixation of trochanteric fractures as shown in FIG. 8.

Referring to FIGS. 8 and 9, the navigation-training model used in this hip screw/intramedullary fixation of trochanteric fractures navigation-training apparatus includes: a base 1, a holding device for fixing a plastic proximal femur model bone 9 on the base 1 in a precise position for the training of the specific orthopedic surgical procedure, and a patient tracker pin 6 mounted on the base 1 and set in a predetermined orientation for securing a patient tracker 61.

In this embodiment, the base 1 is made of acrylic, and is shaped in a rectangle with the size of 333 mm (L)×163 mm (W)×15 mm (H).

The holding device of this navigation-training model includes two parted aluminum poles 8 and a holding block 10 mounted therebetween along the elongated side of base 1. The holding block 10 has a lower portion 101 disposed on the base and an upper portion 102 removable from the lower portion. Two windows 112 are provided symmetrically at the joint between the upper portion and the lower portion, and a cylindrical tunnel 103 is provided extended along the elongated direction of the base between the two windows to hold the plastic proximal femur bone.

The two aluminum poles 8, for example, can be of 12.5 mm in diameter and of different heights (66 mm and 88 mm), and fixed 233 mm apart from each other on the base 1. The two aluminum poles 8 serve to maintain the plastic proximal femur model bone 9 fixed in the accurate position. The holding block 10 can be made of epoxy, with dimension of 80 mm (L)×62 mm (W)×62 mm (H) and has two openings 112 at both sides for distal locking and lag screw insertion.

Figure 9A:
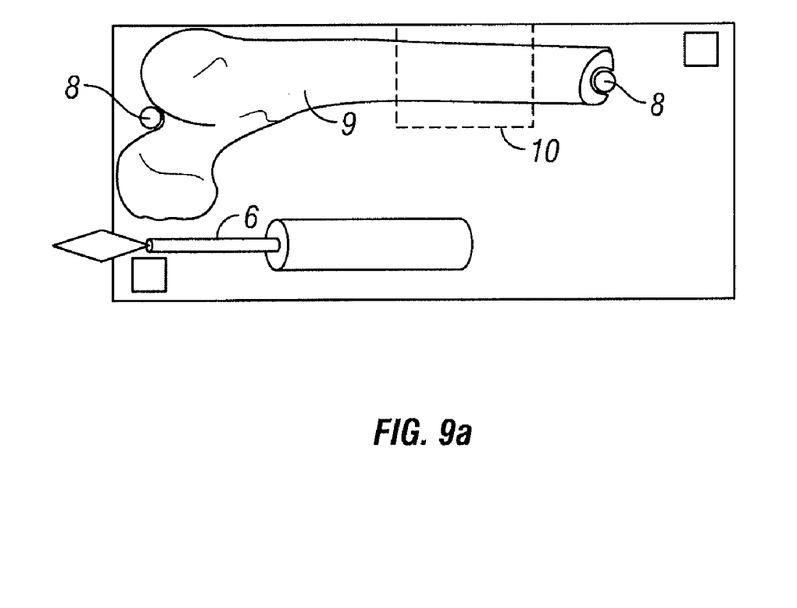
FIG. 9a shows a top view of the navigation-training model for hip screw/intramedullary fixation of trochanteric fractures in FIG. 9.
Figure 9B:
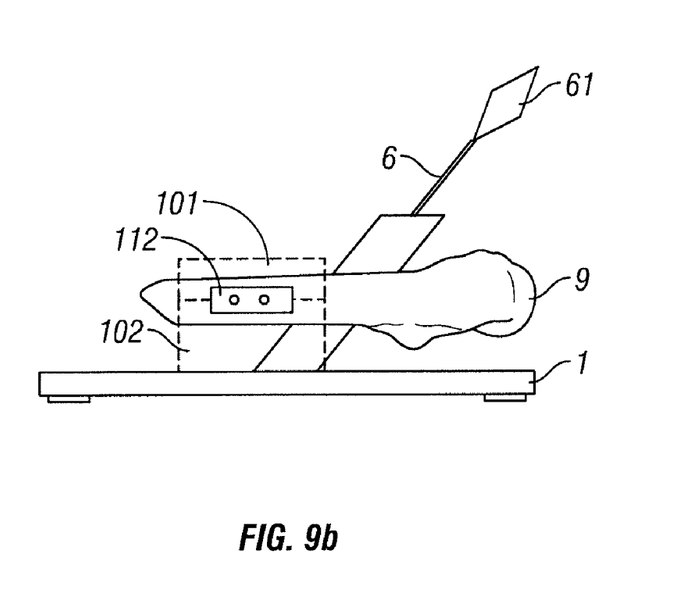
FIG. 9b shows a side view of the navigation-training model for hip screw/intramedullary fixation of trochanteric fractures in FIG. 9.

Referring to FIGS. 9a and 9b, the patient tracker pin 6 is fixed on the base 1 at 45° from the surface of the base 1, and 25° between the projecting line of the patient tracker pin 6 onto the base 1 and the elongated side of the base 1. It visualizes the plastic proximal femur model bone 9 for training on fluoroscopic images-guided cannulated hip screws and Gamma nail insertion and lag screw positioning.

Figure 10:
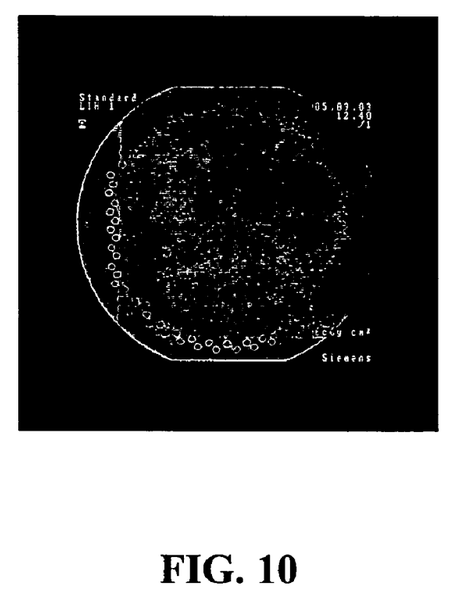
FIG. 10 shows a fluoroscopic image of the frontal view of the plastic proximal femur model bone secured on the navigation-training model for hip screw/intramedullary fixation of trochanteric fractures.
Figure 11:
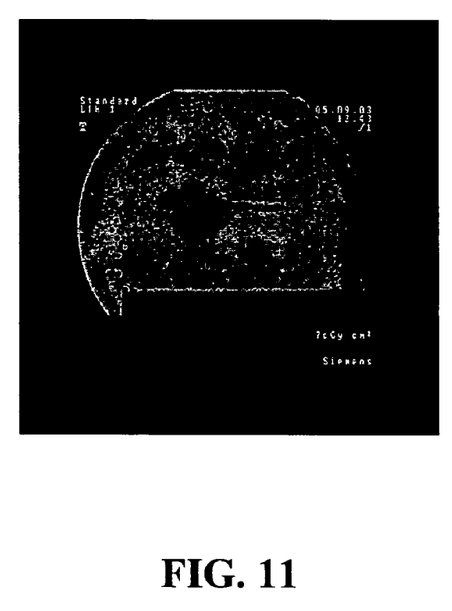
FIG. 11 shows a fluoroscopic image of the true sagittal view of the plastic proximal femur model bone secured on the navigation-training model for hip screw/intramedullary fixation of trochanteric fractures.

During computer-assisted images-guided surgical training, the plastic proximal femur model bone 9 is secured by two aluminum poles 8 and the epoxy holding block 10, and the patient tracker 61 is attached to the patient tracker pin 6. Fluoroscopic images of the plastic proximal femur model bone 9 are taken by a C-arm fluoroscope as indicated above. FIGS. 10 and 11 show the fluoroscopic images of the plastic proximal femur model bone 9 which are frontal and true sagittal views. The fluoroscopic images of different views of the plastic proximal femur model bone 9 are loaded onto the computer of the navigation system.

A tool tracker is then fixed to the surgical tool and both are calibrated with the navigation system. Crosshairs show the relative locations of the tool to the fluoroscopic images and the patient tracker in different views on the display of the navigation system. The trainee can then practice computer-assisted images-guided cannulated hip screws and Gamma nail insertion and lag screw positioning with the tracked surgical tool. The procedures can be followed exactly and the result can be observed on the display in real-time.

In a third embodiment of the present invention, the distal locking navigation-training apparatus is provided for training on computer-assisted fluoroscopic images-guided distal locking. This navigation training apparatus comprises a distal locking navigation training model and a navigation system having a computer that stores a plurality of fluoroscopic images of the plastic femur model bone mounted on the navigation-training model.

Figure 12:
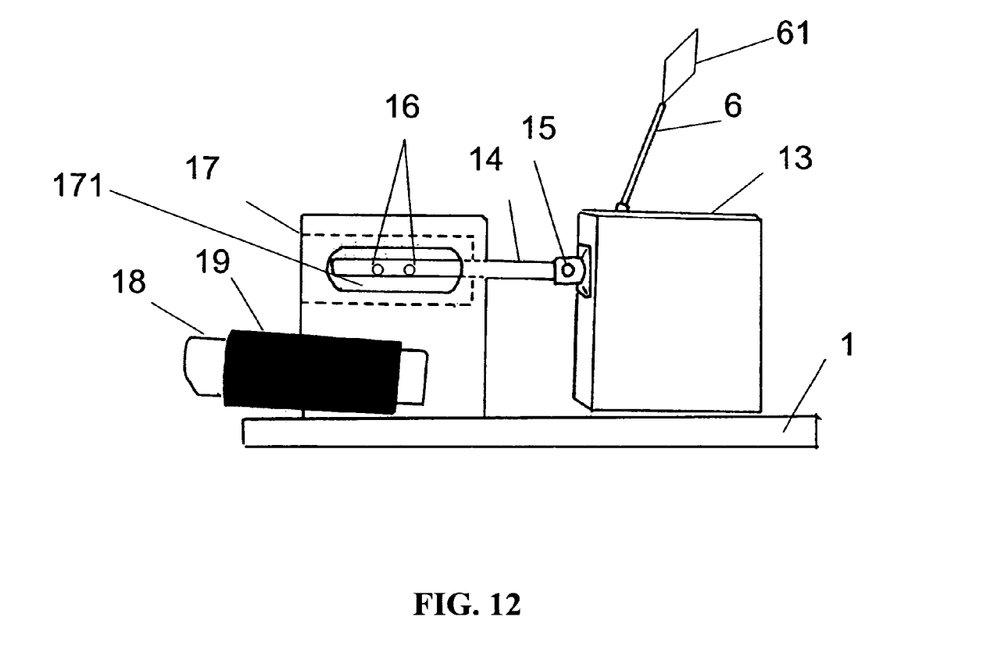
FIG. 12 shows a distal locking navigation-training model and a section of the plastic proximal femur model bone covered with insulating materials.
Figure 13:
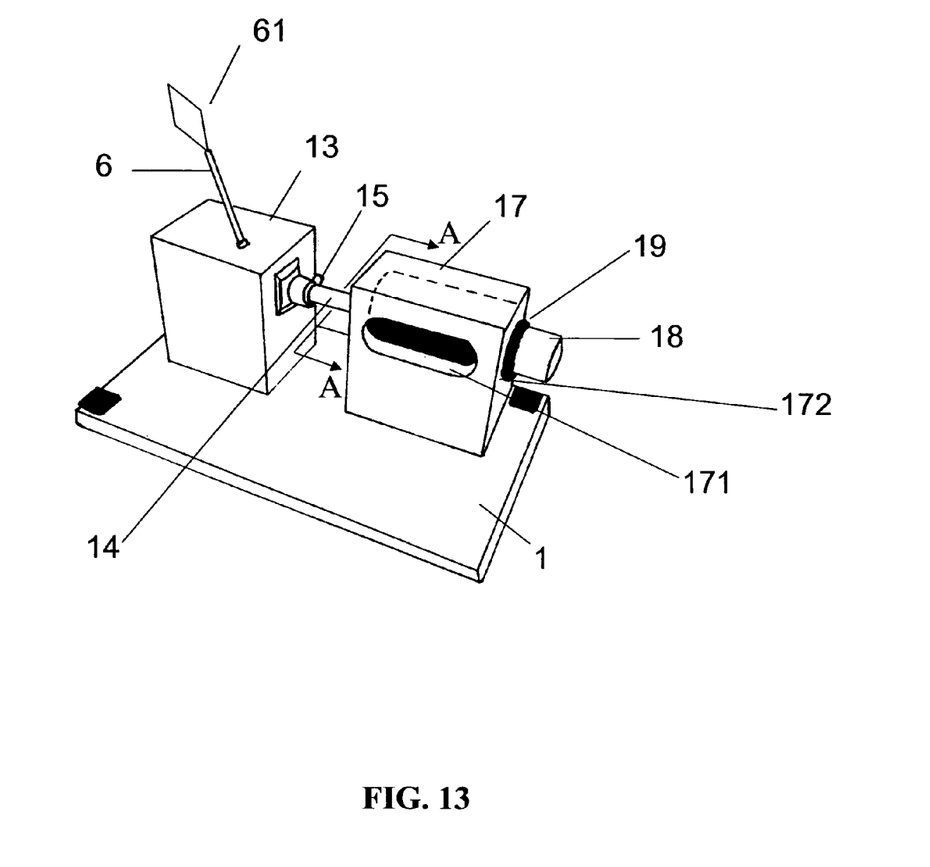
FIG. 13 shows a section of the plastic proximal femur model bone covered with insulating materials placed onto the distal locking navigation-training model.

Referring to FIGS. 12 and 13, the distal locking navigation-training model used in this distal locking navigation-training apparatus includes: a base 1, a holding device for fixing a plastic femur model bone 18 onto the base 1 in a precise position for training of specific orthopedic surgical procedure, and a patient tracker pin 6 set in a predetermined orientation for securing a patient tracker 61.

The plastic femur model bone 18 is covered with insulating materials 19 and inserted with a stainless steel rod 14. The stainless steel rod 14 has two parted parallel holes 16 at the distal end thereof.

In this embodiment, the base 1 used in this distal locking navigation-training model is made of acrylic, in a rectangular shape, with a size of 325 mm (L)×195 mm (W)×15 mm (H).

The holding device used in this distal locking navigation-training model includes a first holding block 13 and a second holding block 17 mounted to the base 1. For example, the first holding block 13 has a size of 100 mm (L)×75 mm (W)×128 mm (H). The first holding block 13 and the second holding block 17 can be made of acrylic. The first holding block 13 secures a patient tracker pin 6 in a predetermined direction and secures the stainless steel rod 14 horizontally extended toward the second holding block 17.

The stainless steel rod 14, for example, having a length of 210 mm, a thread length of 62 mm, and a diameter of 12 mm, which simulates an interlocking nail, is mounted horizontally to the first holding block 13 at a height of 80 mm. Referring to FIGS. 12 and 13, a set screw 15 on the threaded insert is used to maintain the correct orientation of the stainless steel rod 14. Two screw holes 16 of 6.28 mm in diameter and 25.4 mm apart from each other are drilled on the stainless steel rod 14 passing through the medullary canal of the plastic bone 18 to simulate the distal locking holes of the interlocking nail.

The second holding block 17 has two windows 171 and a cylindrical tunnel 172 is provided extended along the elongated direction of the base between the two windows 171 to hold the plastic femur bone 18. Since the plastic femur model bone 18 is covered with insulating materials 19, the distal locking holes 16 of the stainless steel rod 14 are not exposed.

Figure 13A:
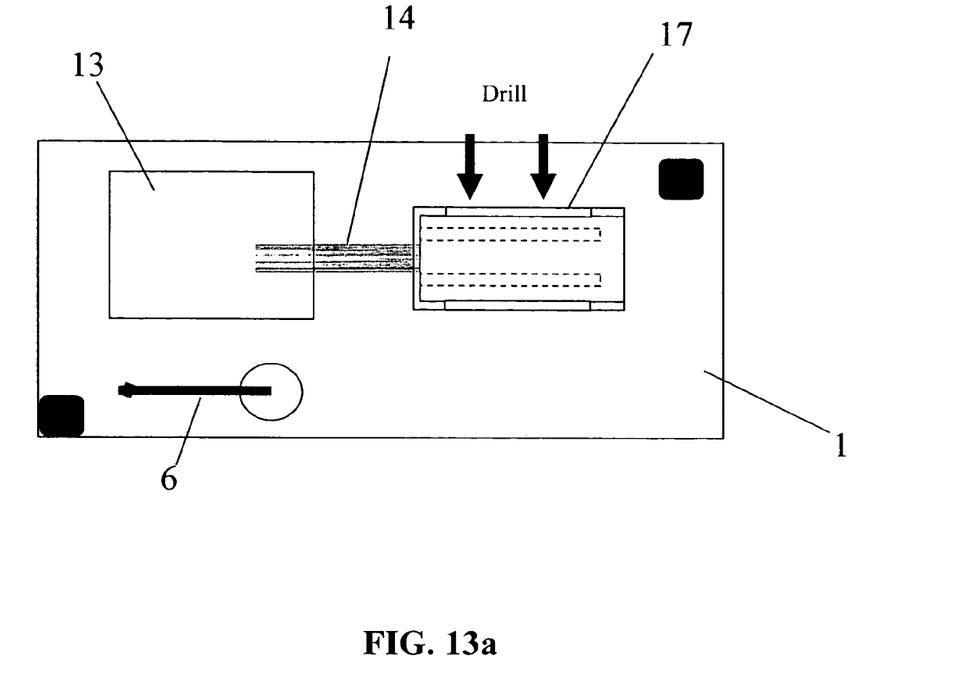
FIG. 13a shows a top sectional view of the distal locking navigation-training model.
Figure 13B:
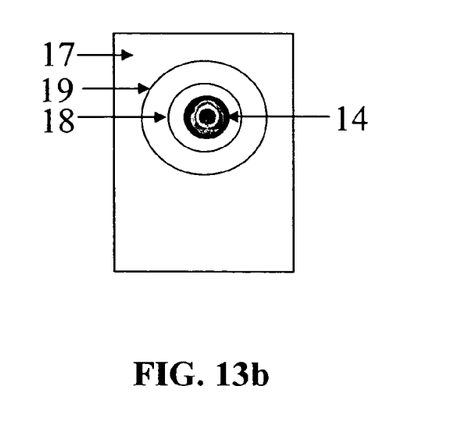
FIG. 13b shows a view taken along the line A-A shown in FIG. 13.

The patient tracker pin 6 is tilted 45° with the surface of the base 1, referring to FIG. 13a, the projecting line of the patient tracker pin 6 onto the base 1 is parallel with the elongated side of the base 1 which visualizes the plastic femur model bone 18 covered with insulating materials 19 for training on fluoroscopic images-guided distal locking.

Figure 14:
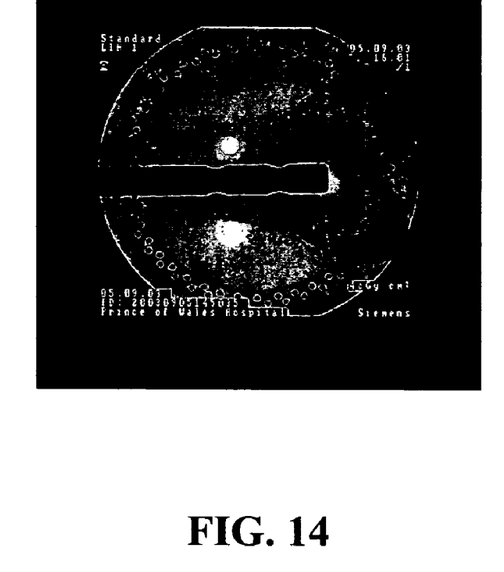
FIG. 14 shows a fluoroscopic image of the frontal view of the plastic femur model bone inserted with an intramedullary nail with two interlocking holes and secured on the distal locking navigation-training model.
Figure 15:
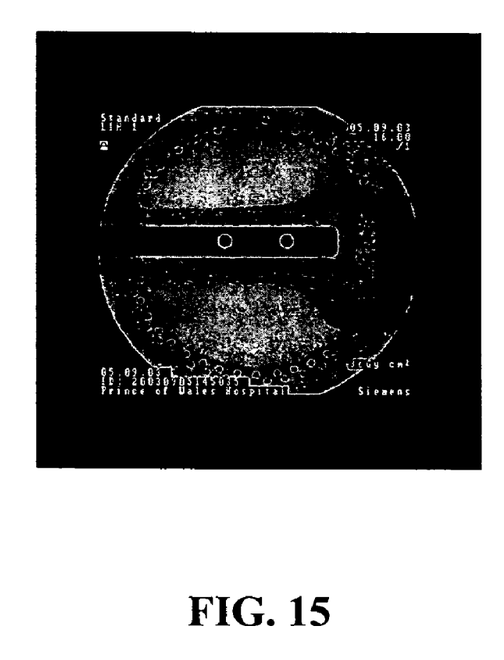
FIG. 15 shows a fluoroscopic image of the true sagittal view of the plastic femur model bone inserted with an intramedullary nail with two interlocking holes and secured on the distal locking navigation-training model.

With the plastic femur model bone 18 being fixed on the distal locking navigation-training model, fluoroscopic images of the plastic femur model bone 18 mounted on the distal locking navigation-training model are captured by the C-arm fluoroscope. Referring to FIGS. 14 and 15, the fluoroscopic images of the plastic femur model bone 18 used in the embodiment are frontal and true sagittal views. They are stored in the computer of the navigation system and can be retrieved for surgical training.

During computer-assisted images-guided surgical training, the plastic femur model bone 18 is secured to the base 1 and the patient tracker 61 is attached to the patient tracker pin 6. The fluoroscopic images of different views of the plastic femur model bone 18 inserted with the stainless steel rod 14 having distal locking holes 16 as shown in FIGS. 14 and 15 are loaded onto the computer of the navigation system. A tool tracker is fixed to the surgical tool and both are calibrated with a common 3D coordinate system, and crosshairs show the relative locations of the surgical tool to the fluoroscopic images and the patient tracker in different views on the display of the navigation system. The trainee can thus practice computer-assisted images-guided distal locking with the surgical tool. The procedures can be followed exactly and the result can be observed on the display in real-time.

It should be understood that the above description and embodiments of the invention are merely intended to be illustrative, and equivalents to the invention may be apparent to those skilled in the art without departing from the spirit of the invention.

What is claimed is:

1. A navigation-training apparatus for image-guided orthopedic surgery comprising:
   a navigation-training model, which comprises:
   a base,
   a holding device for fixing a surgical practice model bone to said base in a predetermined position, and
   a support mounted on said base separate and independent from the surgical practice model bone, said support configured to secure a patient tracker in a predetermined and constant orientation relative to the holding device to maintain that a constant orientation and relative position between the patient tracker and the surgical practice model bone is always constant each time a patient tracker and a surgical model bone are placed on the navigation-training model;

a navigation system for storing a plurality of pre-captured images of the surgical practice model bone and having a monitor screen; and at least one surgical tool attached with a tool tracker communicated with the navigation system, wherein the monitor screen is configured to display the pre-captured images of the surgical practice model bone during a navigation-training, the surgical tool is configured to move in relative to a desired position in the surgical practice model bone during a navigation-training, and the monitor screen is further configured to show a tracked position of the surgical tool based at least on the tool tracker over the displayed images with respect to a coordinate frame provided by the patient tracker in a 3D coordinate system during a navigation-training, so as to make the surgical tool to be accurately positioned in said desired position in the surgical practice model bone.

2. The navigation-training apparatus according to claim 1, wherein said surgical practice model bone is a plastic pelvic bone, and said support is a pin tilted at a first predetermined angle with the surface of said base.

3. The navigation-training apparatus according to claim 2, wherein said first predetermined angle is 70°.

4. The navigation-training apparatus according to claim 2, wherein said holding device includes at least one pole extended upwards from the surface of said base to pass though said surgical practice model bone such that said surgical practice model bone can be fixed to said base.

5. The navigation-training apparatus according to claim 4, wherein said holding device includes first two poles and second two poles disposed in parallel, said first poles are longer and disposed closer to said pin than said second poles, and said second poles pass through the sacrum of said plastic pelvis bone and are fixed with a lock nut respectively.

6. The navigation-training apparatus according to claim 1, wherein said surgical practice model bone is a plastic proximal femur bone, said holding device includes two poles in parallel and a holding block disposed therebetween, said two poles extend upwards through the two ends of said proximal femur bone, and said holding block has a lower portion disposed on the base and an upper portion removable from the lower portion, wherein two windows are provided symmetrically at the joint between the upper portion and the lower portion, and a tunnel is provided extended along the elongated direction of said base between the two windows to hold said plastic proximal femur bone.

7. The navigation-training model according to claim 6, wherein said support is a pin forming an angle of 45° with the surface of said base, and an angle of 25° between the projecting line of said tracker pin onto said base and the direction in length of said base.

8. The navigation-training model according to claim 1, wherein said surgical practice model bone is a plastic femur bone inserted with a rod having two parted parallel holes at the distal end thereof, said holding device includes a first holding block and a second holding block mounted to said base, said first holding block secures said support in a predetermined direction and secures said rod horizontally extended towards said second holding block, and said second holding block has two windows and a tunnel is provided extended along the elongated direction of said base between the two windows to hold said plastic femur bone.

9. The navigation-training model according to claim 8, wherein said support is a pin tilted 45° with the surface of said base.

10. The navigation-training model according to claim 8, wherein said plastic femur bone is surrounded with insulating materials.

11. A navigation-training method for image-guided orthopedic surgery, comprising the steps of:

providing a navigation-training model, which includes:
  a base;
  a holding device for fixing a surgical practice model bone to said base in a predetermined position; and
  a support mounted on the base separate and independent from the surgical practice model bone, said support configured to secure a patient tracker in a predetermined and constant orientation relative to the holding device to maintain that a constant orientation and relative position between the patient tracker and the surgical practice model bone is always constant each time a patient tracker and a surgical model bone are placed on the navigation-training model;

providing images of said surgical practice model bone and uploading the same in a navigation system, wherein a plurality of pre-captured images of the surgical practice model bone is stored in the navigation system;

loading said images on a display of the navigation system;

moving a surgical tool attached with a tool tracker communicating with the navigation system relative to a desired position in the surgical practice model bone; and displaying a position of the surgical tool based at least on the tool tracker over the images with respect to a coordinate frame provided by the patient tracker in a 3D coordinate system, so as to make the surgical tool to be accurately tracked and positioned in said desired position in the surgical practice model bone.

* * * * *

UNITED STATES PATENT AND TRADEMARK OFFICE
Certificate

Patent No. 8,021,162 B2

Patented: September 20, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kwok-Sui Leung, Hong Kong (CN).

Signed and Sealed this Tenth Day of April 2012.

XUAN M. THAI
*Supervisory Patent Examiner*
Art Unit 3715
Technology Center 3700